United States Patent
Aritsuka

(10) Patent No.: US 7,365,451 B2
(45) Date of Patent: Apr. 29, 2008

(54) POWER CONVERTER

(75) Inventor: Tomohiko Aritsuka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 189 days.

(21) Appl. No.: 10/544,126

(22) PCT Filed: Feb. 12, 2004

(86) PCT No.: PCT/JP2004/001461

§ 371 (c)(1),
(2), (4) Date: Aug. 2, 2005

(87) PCT Pub. No.: WO2005/078889

PCT Pub. Date: Aug. 25, 2005

(65) Prior Publication Data

US 2006/0131960 A1    Jun. 22, 2006

(51) Int. Cl.
*H02J 3/00* (2006.01)
*H02H 7/04* (2006.01)
*H02H 3/00* (2006.01)

(52) U.S. Cl. .............. 307/17; 307/82; 307/83; 361/35; 361/36; 361/38; 361/67; 323/271; 323/272; 323/275; 323/276; 363/25; 363/39

(58) Field of Classification Search ............ 307/17, 307/82, 83; 361/35, 36, 38, 67; 323/271, 323/272, 275, 276; 363/25, 39
See application file for complete search history.

(56) References Cited

U.S. PATENT DOCUMENTS

| | | | | |
|---|---|---|---|---|
| 2,394,126 | A * | 2/1946 | Warrington | 361/67 |
| 4,922,364 | A * | 5/1990 | Paulsson | 361/16 |
| 5,206,775 | A * | 4/1993 | Wilson | 361/15 |
| 5,646,511 | A * | 7/1997 | Akamatsu et al. | 323/207 |
| 5,815,387 | A | 9/1998 | Aritsuka | |
| 5,986,909 | A * | 11/1999 | Hammond et al. | 363/65 |
| 6,075,349 | A | 6/2000 | Okayama | |
| 7,154,722 | B1 * | 12/2006 | Stoupis et al. | 361/62 |

FOREIGN PATENT DOCUMENTS

| | | |
|---|---|---|
| JP | 5-130750 | 5/1993 |
| JP | 10-28319 | 1/1998 |

* cited by examiner

*Primary Examiner*—Michael Sherry
*Assistant Examiner*—Hal I Kaplan
(74) *Attorney, Agent, or Firm*—Leydig, Voit & Mayer, Ltd.

(57) ABSTRACT

A power converter that can continue to operate after suffering a partial failure. The power converter includes multiple array transformers; normally-on switches connected respectively in series with the ends of each of the primary windings of the array transformers; normally-off current bypass devices connected in parallel with the series connections of the primary windings of the array transformers and the switches at the transformer ends; AC-DC converter units having AC sides respectively connected secondary windings of the array transformers; and mutually independent DC circuits respectively connected to DC sides of the AC-DC converter units. By turning on the current bypass device of the primary winding of a specified array transformer and turning off the switches at the ends of that primary winding, it is possible to isolate the specified array transformer and the AC-DC converter unit connected to it.

6 Claims, 7 Drawing Sheets

POWER CONVERTER

TECHNICAL FIELD

This invention relates to a power converter connected in series with a line such as a power line, a distribution line or a single-phase AC wire, and particularly to a power converter capable of continuing to operate after suffering a partial failure.

BACKGROUND ART

FIG. 8 is a circuit diagram showing the construction of a power converter of related art disclosed in for example U.S. Pat. No. 5,646,511. In this power converter, a series transformer having its primary winding connected in series with a power line, a distribution line or a single-phase AC wire for an electric train or the like (hereinafter abbreviated to 'line') and multiple array transformers on the secondary side of this series transformer are combined in two stages to connect AC-DC converter units to the line. This power converter has the function of a line power tide current control apparatus. In the figure, the primary winding 201 of a series transformer 200 is connected between the power supply side 1 of a line and a power supply side or load side 2 of the line. The primary windings 411 to 441 of array transformers 410 to 440 (the case of a four-stage array is shown) are connected in series with the secondary winding 202 of the series transformer 200. The AC sides of AC-DC converter units 510 to 540 are respectively connected to the secondary windings 412 to 442 of the array transformers 410 to 440, and the DC sides of the four AC-DC converter units 510 to 540 are connected to a common DC circuit 511.

Because power converters of related art have been constructed like this, if even one of the multiple AC-DC converter units 510 to 540 fails, because it is impossible to maintain the DC voltage of the DC circuit 511, none of the AC-DC converter units can be operated, and it has been necessary to shut down the power converter. And there has been the problem that the power converter has to be shut down until repair or periodic checking is complete, and the availability of the system falls.

The present invention was made to solve these problems, and it is an object of the invention to provide a power converter capable of continuing to operate as a system even when one of multiple AC-DC converter units fails or is stopped for a periodic check.

DISCLOSURE OF THE INVENTION

The invention provides a power converter having a series transformer with its primary winding connected in series with a line, multiple array transformers connected in series with the secondary winding of this series transformer, normally-on switches connected in series with the ends of the primary windings of the array transformers, normally-off current bypass devices connected in parallel with the series connections of the primary windings of the array transformers and the switches at their ends, AC-DC converter units having their AC sides connected to each of the secondary windings of the multiple array transformers, and mutually independent DC circuits severally connected to the DC sides of the AC-DC converter units, wherein by turning on the current bypass device of the primary winding of a specified array transformer and turning off the switches at the ends of that primary winding it is possible to isolate the specified array transformer and the AC-DC converter unit connected to it.

By this means it is possible not only to increase the availability and the reliability of the apparatus as a whole but also to raise the capacity of the apparatus by easily making additions to it.

The invention also provides a power converter including multiple array transformers having their primary windings connected to a line in series, normally-on switches connected in series with the ends of the primary windings of the array transformers, normally-off first current bypass devices connected in parallel with the series connections of the primary windings of the array transformers and the switches connected to their ends, AC-DC converter units having their AC sides connected to the secondary windings of each of the array transformers, mutually independent DC circuits connected to the DC sides of the AC-DC converter units, and a normally-off second current bypass device connected in parallel with all of the series-connected array transformers, wherein by turning on the first current bypass device of the primary winding of a specified array transformer and turning off the switches at the ends of that primary winding it is possible to isolate the specified array transformer and the AC-DC converter unit connected to it.

By this means it is possible not only to increase the availability and the reliability of the apparatus as a whole but also to raise the capacity of the apparatus by easily making additions to it.

BEST MODE FOR CARRYING OUT THE INVENTION

First Preferred Embodiment

Figure 1:
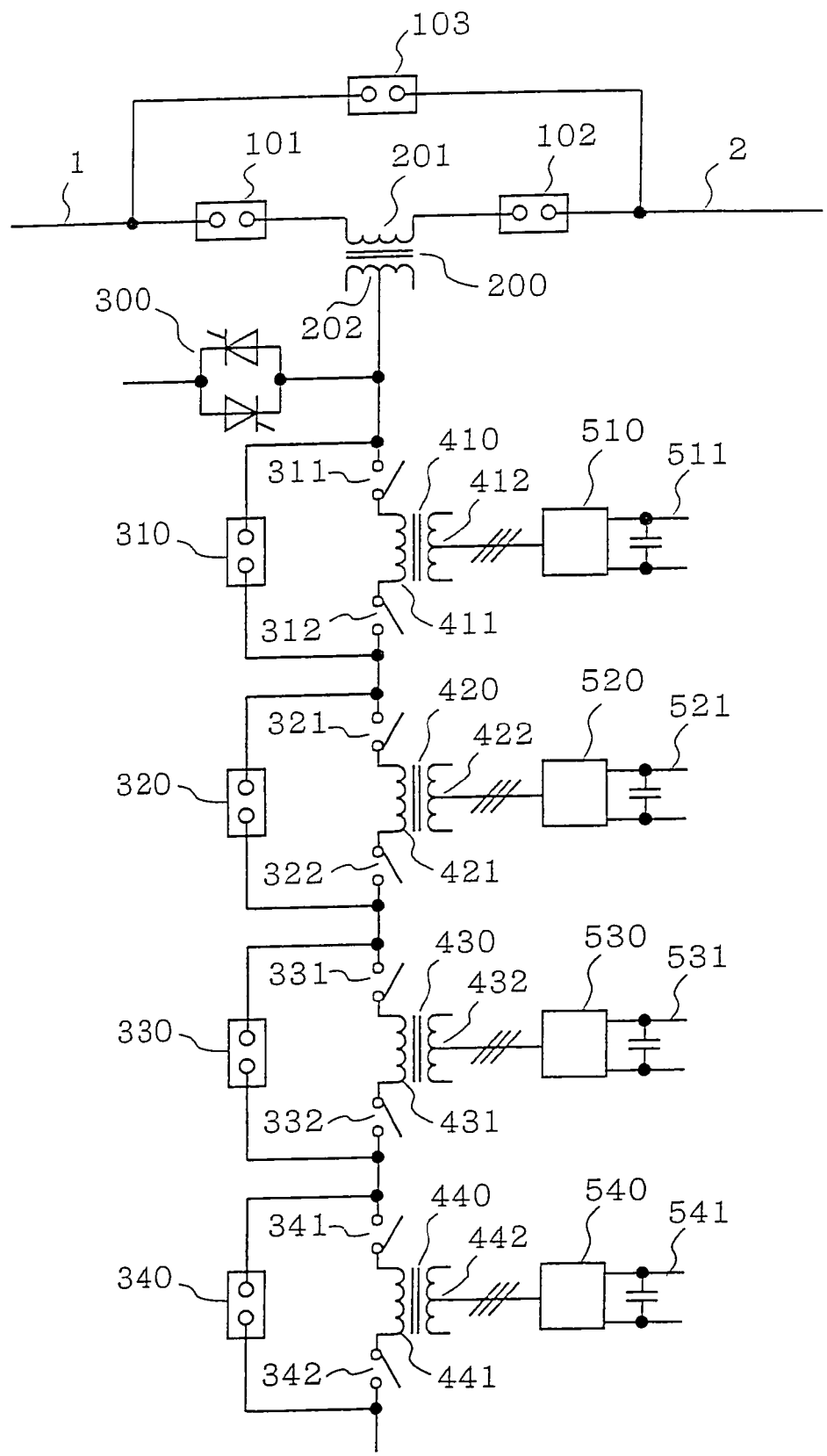
FIG. 1 is a circuit diagram showing the construction of a first preferred embodiment of a power converter according to the invention.

FIG. 1 is a circuit diagram showing the construction of a first preferred embodiment of a power converter according to the invention. (Throughout the figures, the same reference numerals denote the same or equivalent parts.) In FIG. 1, the primary winding 201 of a series transformer 200 is connected in series between a power supply side 1 of a line and a power supply side or load side 2 of the line. The primary windings 411 to 441 of array transformers 410 to 440 (the case of a four-stage array is shown) are connected in series to the secondary winding 202 of the series transformer 200. The AC sides of four AC-DC converter units 510 to 540 are respectively connected to the secondary windings 412 to 442 of the array transformers 410 to 440, and mutually independent DC circuits 511 to 541 are connected the DC sides of the AC-DC converter units 510 to 540.

This power converter according to the invention is of a construction such that the individual DC circuits 511 to 541 of the AC-DC converter units 510 to 540 are made mutually independent, and are not connected to the DC circuit of any other AC-DC converter unit. Normally-on switches (circuit breakers, isolators or semiconductor switches) 311 to 341 and 312 to 342 are disposed (connected) in series with the ends of the primary windings 411 to 441 of the array transformers 410 to 440, and normally-off current bypass devices (circuit breakers, isolators or semiconductor switches) 310 to 340 are disposed (connected) in parallel with the series connections of the primary windings 411 to 441 of each of the array transformers 410 to 440 and the switches 311 to 341 and 312 to 342 at their ends. Consequently, the construction is such that when the current bypass device of the primary winding of a certain array transformer is turned on and the switches at the ends of that primary winding are turned off, that array transformer is cut off from the line.

Also, switches (circuit breakers, isolators or semiconductor switches) 101 and 102 are disposed (connected) in series with the ends of the primary winding 201 of the series transformer 200, and a current bypass device (circuit breaker, isolator or semiconductor switch) 103 is disposed (connected) in parallel with the series connection of the primary winding 201 of the series transformer 200 and the two switches 101, 102.

Further, a short-circuiting switch (circuit breaker, isolator or semiconductor switch) 300 for short-circuiting the secondary winding 202 of the series transformer 200 is provided, so that the AC-DC converter units 510 to 540 and the array transformers 410 to 440 can all be protected from short-circuit current at the time of a line accident. In some cases, because the current bypass devices 310 to 340 are present, the short-circuiting device 300 may be dispensed with. This decision can be made on the basis of the design considerations of cost, available space, and redundancy.

In this first preferred embodiment, as the winding arrangement of the secondary winding 202 of the series transformer 200, a delta connection, a Y connection, or a single-phase connection can be used. Also, as the winding arrangement of each of the secondary windings 412 to 442 of the array transformers 410 to 440, a delta connection a Y connection, or a single-phase connection can be used.

Next, the operation of this power converter will be explained. A characterizing feature of a power converter connected in series with a line is that the AC-DC converter units 510 to 540 themselves cannot directly control the currents flowing to the units, and what they control are only the magnitudes and the phases of the voltages that the AC-DC converter units 510 to 540 output. The reason that the power converter can control the current of the line indirectly is that the vector sum of the output voltages of the AC-DC converter units 510 to 540 produces a voltage in the primary winding 201 of the series transformer 200 by way of the array transformers 410 to 440. With an injection voltage producing a voltage of a certain phase and a certain magnitude between line 1 and line 2, all the voltage sources and current sources on the line network, and it is possible to change the current passing through the power converter. In this sense, this power converter has the function of a line power tide current control apparatus. Because of this, as the AC-DC converter units 510 to 540 of the power converter, voltage source converters, which constitute voltage sources, are employed. As a consequence of this operating principle, it is not necessary for all the AC-DC converter units to produce the same voltage, and even if one AC-DC converter unit has stopped, the power converter can operate without any problem.

During normal operation of the power converter of the first preferred embodiment, the current bypass device 103 is in its OFF state, the switches 101 and 102 are in their ON states, the short-circuiting device 300 is in its OFF state, the current bypass devices 310 to 340 are in their OFF states, and the switches 311 to 341 and 312 to 342 are in their ON states.

It will now be supposed that the AC-DC converter unit 510 has a failure. At this time, because the current bypass device 310 has been turned on and the switches 311 and 312 have been turned off, in this first preferred embodiment, because the DC circuit 511 has been electrically cut off from the DC circuits 521 to 541 of the other AC-DC converter units, the power converter can continue to operate. The reason why it has not been possible for a power converter of the related art to operate with one or more AC-DC converter units out is that the AC-DC converter units have not been independent on either the AC side or the DC side.

The group of AC-DC converter units 510 to 540 as a whole is required to produce a specified differential voltage in the primary winding 201 of the series transformer 200. In this first preferred embodiment, because the AC-DC converter units 510 to 540 are constructed independently, even if one or more of these AC-DC converter units fails, the power converter can still operate.

When the required specifications of the power converter are satisfied by a number of AC-DC converter units (N), if redundancy of one or more (n) units is added and (N+n) AC-DC converter units are provided, then even if n AC-DC converter units fail, operation is possible without the maximum rating of the system being exceeded. Consequently, if AC-DC converter units are provided for redundancy, operation at the 100% rating of the power converter is possible, even with a number of AC-DC converter units corresponding to the redundancy out of service. By this means it is possible to obtain a highly reliable installation.

When the maximum currents flowing through the AC-DC converter units 510 to 540 at the time of a line accident are greater than the rated currents of the AC-DC converter units 510 to 540, by increasing the number of stages of array transformers and AC-DC converter units in the construction, the maximum currents of the AC-DC converter units 510 to 540 can be reduced. This results from the nature of a power converter connected to a line in series. If the rating of the power converter is defined as the product of the voltage Vs injected into the primary winding of the series transformer 200 and the maximum current Is of the line, then the number of stages (N) can be obtained by dividing the rating of the power converter (Vs×Is) by the product of the rated voltage Vc and the rated current Ic of the array transformer (and AC-DC converter unit) of one stage (Vc×Ic). With just the number of stages N1 obtained from the rated current of the line in normal operation, the maximum current of the AC-DC converter units will exceed the rated current at the time of an accident or the like. Therefore, it is desirable to take into account a maximum current Is2, as of the time of a line accident, in selecting rated current Ic2 of the AC-DC converter units, and to use the AC-DC converter units and the array transformers thus derated so that they are used below their maximum ratings. Because this means designing the voltage of the primary windings 411 to 441 of the array transformers 410 to 440 to be lower, the number of stages N increases.

Also, in this first preferred embodiment, utilizing the nature of the power converter connected in series with a line shown above, it is possible to increase the capacity of the power converter by increasing the number of array transformers and AC-DC converter units, even after the power converter is installed. This characteristic feature is possible because the DC circuits of the AC-DC converter units are independent.

In this first preferred embodiment, in the series transformer 200, normally, when the voltage of the secondary winding has fallen, the maximum current of the secondary winding 202 increases, at the time of a line accident. When the maximum current of the secondary winding 202 exceeds the rated current of the semiconductor switch (short-circuiting device) 300 or the circuit breakers (current bypass devices) 310 to 340 or the isolators (switches) 311 to 341 and 312 to 342, their electrical conditions reverse. In the first preferred embodiment it is also possible to employ a method of optimizing the ratings of the semiconductor switch 300, the circuit breakers 310 to 340 and the isolators 311 to 341 and 312 to 342 by increasing the voltage of the secondary winding.

Second Preferred Embodiment

Figure 2:
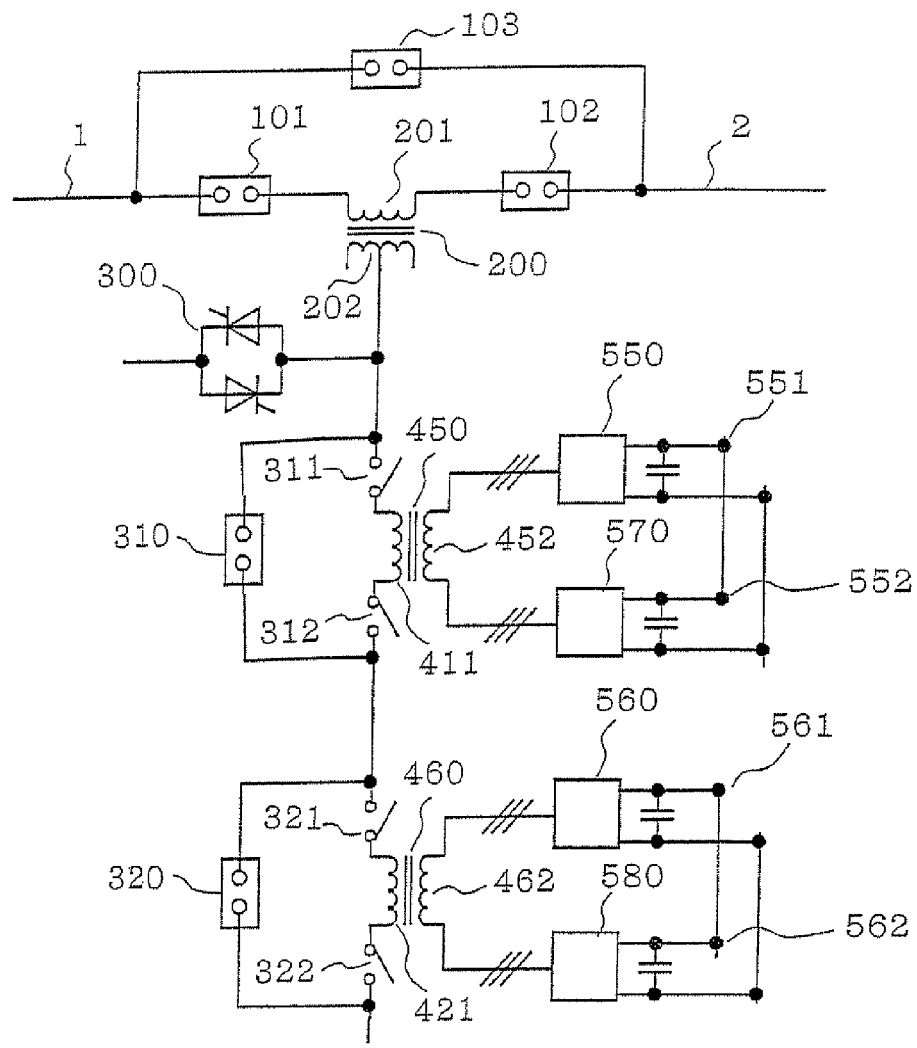
FIG. 2 is a circuit diagram showing the construction of a power converter of a second preferred embodiment.

Whereas in the first preferred embodiment a construction was adopted such that the AC-DC converter units 510 to 540 could be isolated one at a time, as shown in FIG. 2, AC-DC converter units 550 to 580 are connected to the secondary windings 452 and 462 of array transformers 450 and 460, two-by-two. In this case, although the two DC circuits 551 and 552 forming one pair are connected in common, they are independent from the DC circuits 561 and 562 forming another pair. This point is similar to the first preferred embodiment.

When the number of AC-DC converter units is 2×N, compared to the first preferred embodiment, because the number of array transformer stages is N, i.e., half the number in the first preferred embodiment, the manufacturing cost of the array transformers can be expected to be cheaper. In this second preferred embodiment the AC-DC converter units have to be shut down in twos when there is a failure of an AC-DC converter unit or for a periodic check, but if redundancy does not affect the expected availability, an unproblematic system can be provided. And, in this second preferred embodiment because two AC-DC converter units are controlled at the same time, certain circuits of control units (not shown), such as those for DC voltage control can be common and reduced to one circuit per two AC-DC converter units, whereby cost reductions can be achieved.

Figure 3:
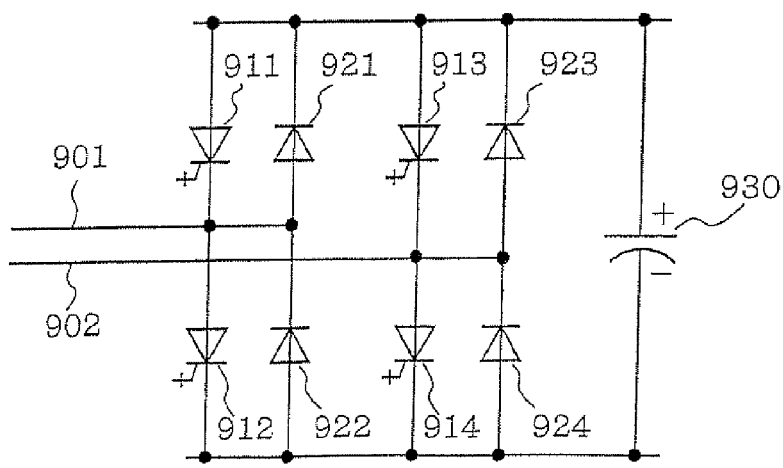
FIG. 3 is a circuit diagram showing the construction of an ordinary single-phase AC-DC converter.

FIG. 3 is a circuit diagram showing the construction of an ordinary single-phase AC-DC converter (single-phase inverter). In the figure, self-quenching devices 911, 912 and flywheel diodes 921, 922 are connected to an AC-side terminal 901, and self-quenching devices 913, 914 and flywheel diodes 923, 924 are connected to an AC-side terminal 902. A condenser 930 is connected to DC-side terminals. The second preferred embodiment can also be applied in a case where an AC-DC converter unit constitutes a single-phase bridge of the kind shown in FIG. 3. In the case of a line, such as a single-phase AC wire for an electric train, because a 3-phase bridge AC-DC converter unit cannot be used, it is necessary to employ a single-phase bridge AC-DC converter unit of the kind shown in FIG. 3.

Third Preferred Embodiment

Figure 4:
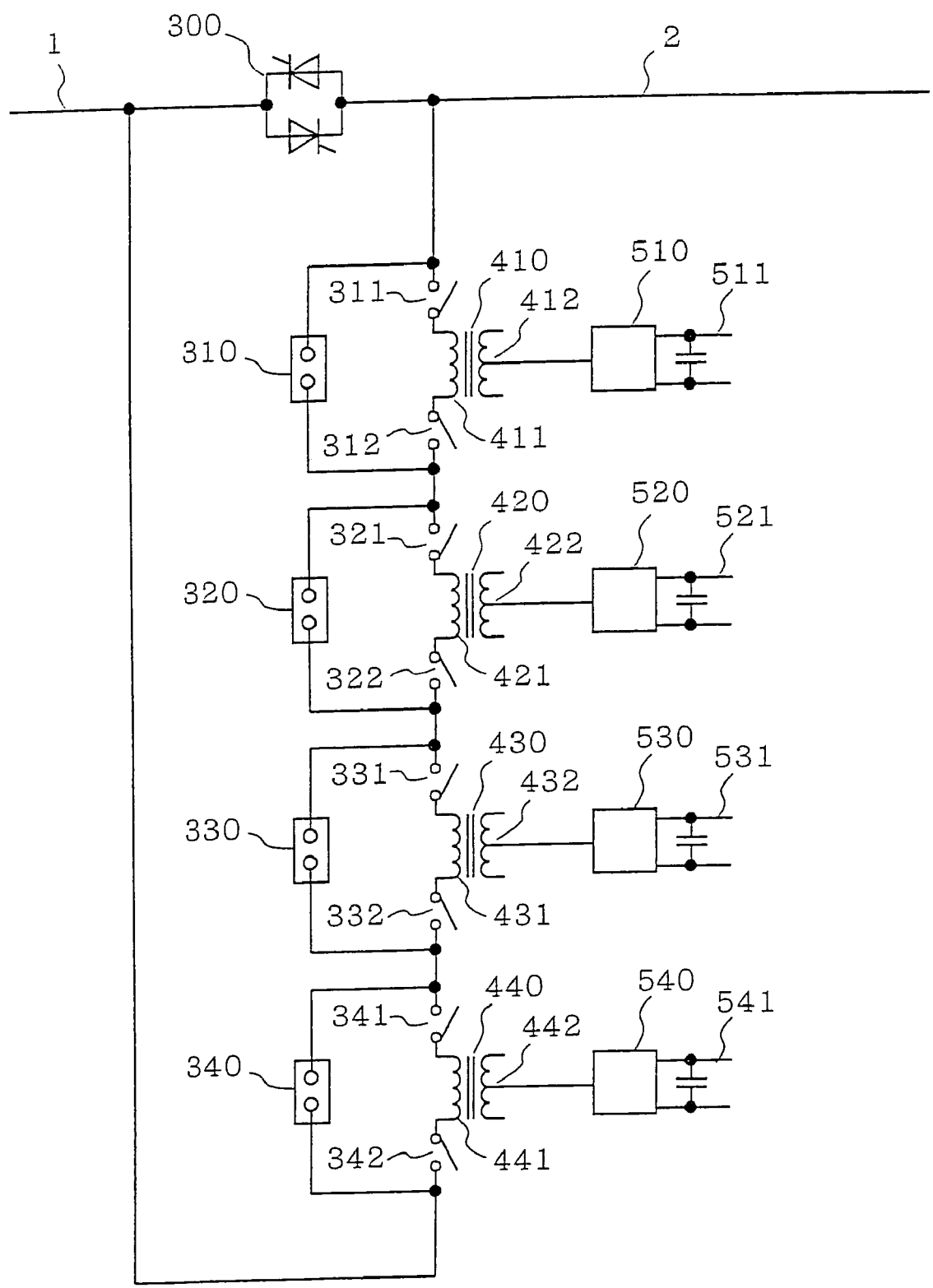
FIG. 4 is a circuit diagram showing the construction of a power converter of a third preferred embodiment.

Whereas in the first preferred embodiment a series transformer 200 was disposed between a power supply side 1 of a line and a power supply side or load side 2 of the line and array transformers 410 to 440 and AC-DC converter units 510 to 540 were provided, the array transformers 410 to 440 can also be connected in series between a power supply side 1 of a line and a power supply side or load side 2 of the line directly, as in a third preferred embodiment shown in FIG. 4. A current bypass device (circuit breaker, isolator or semiconductor switch) 300 is connected in parallel with all the primary windings 411 to 441 of the array transformers 410 to 440, and at the time of a line accident bypasses all of the primary windings 411 to 441 of the array transformers 410 to 440 together.

The circuit in FIG. 4 can be applied in cases such as when the array transformers can be connected to the line directly, when semiconductor switches can be connected to the line directly, and when the array transformers can transform (normally, reduce) the line voltage, likely to be a relatively high voltage, to the AC voltage of the AC-DC converter units in one stage.

In the first preferred embodiment, normally, when the voltage of the secondary winding of the series transformer 200 is reduced, the current of the secondary winding 202 increases. When, at the time of a line accident, the maximum current flowing through the secondary winding 202 becomes too large, a semiconductor switch 300 with a large rated current is actuated. If it is easier to manufacture a high-voltage semiconductor switch 300 with a low rated current than a low-voltage semiconductor switch 300 with a high rated current, the series transformer 200 can be dispensed with and a construction like that of the third preferred embodiment employed.

Fourth Preferred Embodiment

Figure 5:
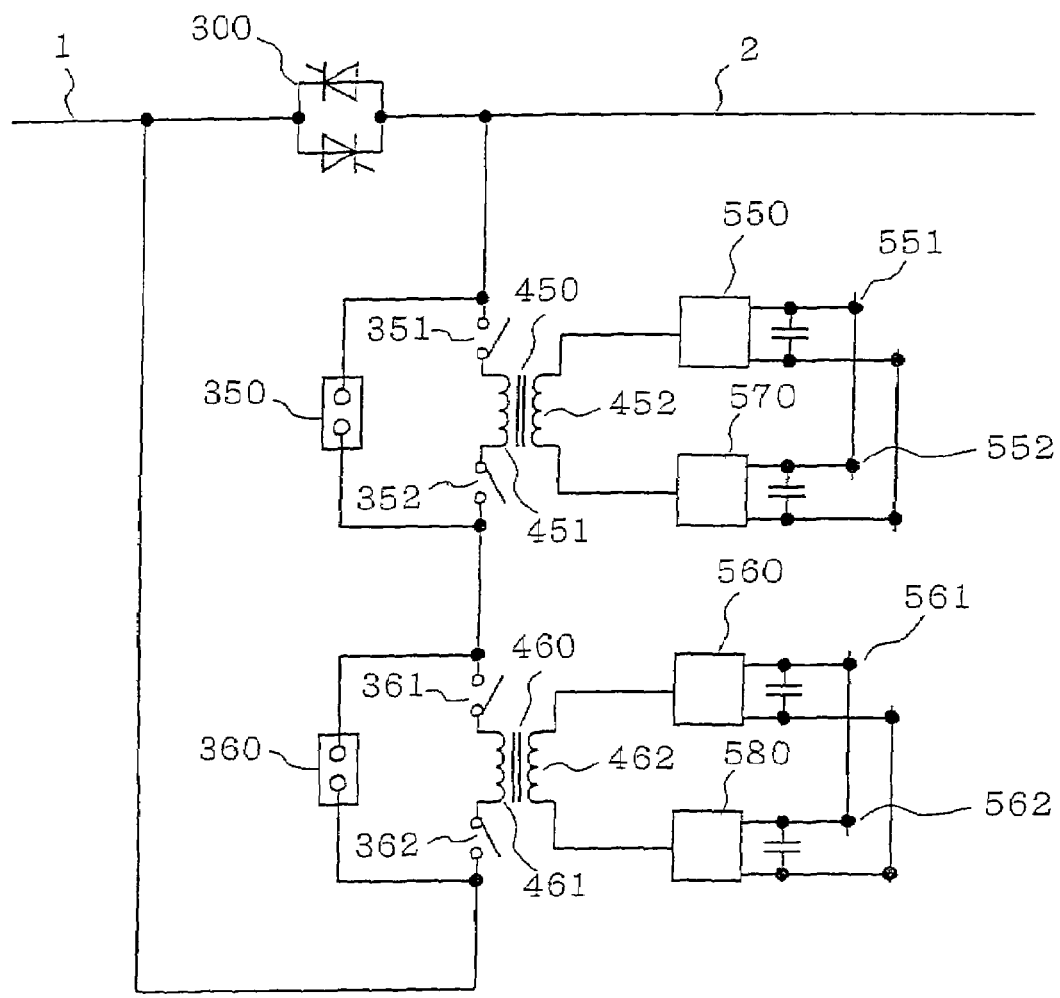
FIG. 5 is a circuit diagram showing the construction of a power converter of a fourth preferred embodiment.

Whereas in the second preferred embodiment the series transformer 200 was disposed between a power supply side 1 of a line and a power supply side or load side 2 of the line and array transformers 410 and 420 and AC-DC converter units 550 to 580 were provided, a construction in which array transformers 450 and 460 are connected in series between a power supply side 1 of a line and a power supply side or load side 2 of the line directly is also possible, as in the fourth embodiment shown in FIG. 5. A current bypass switch (circuit breaker, isolator or semiconductor switch) 300 is connected in parallel with all the primary windings 451 to 461 of the array transformers 450 and 460, and, at the time of a line accident, bypasses the primary windings 451 and 461 of the array transformers 450 and 460 together.

The circuit of FIG. 5 can be applied in cases such as when the array transformers can be connected to the line directly, when semiconductor switches can be connected to the line directly, and when the array transformers can transform (normally, reduce) the line voltage, likely to be a relatively high voltage, to the AC voltage of the AC-DC converter units in one stage.

In the second preferred embodiment, normally, when the voltage of the secondary winding of the series transformer 200 is reduced, the current of the secondary winding 202 increases. When, at the time of a line accident, the maximum current flowing through the secondary winding 202 becomes too large, a semiconductor switch 300 with a large rated current is actuated. If it is easier to manufacture a high-voltage semiconductor switch 300 with a low rated current than to manufacture a low-voltage semiconductor switch 300 with a high rated current, the series transformer 200 can be dispensed with and a construction like that of the fourth preferred embodiment employed.

Fifth Preferred Embodiment

Figure 6:
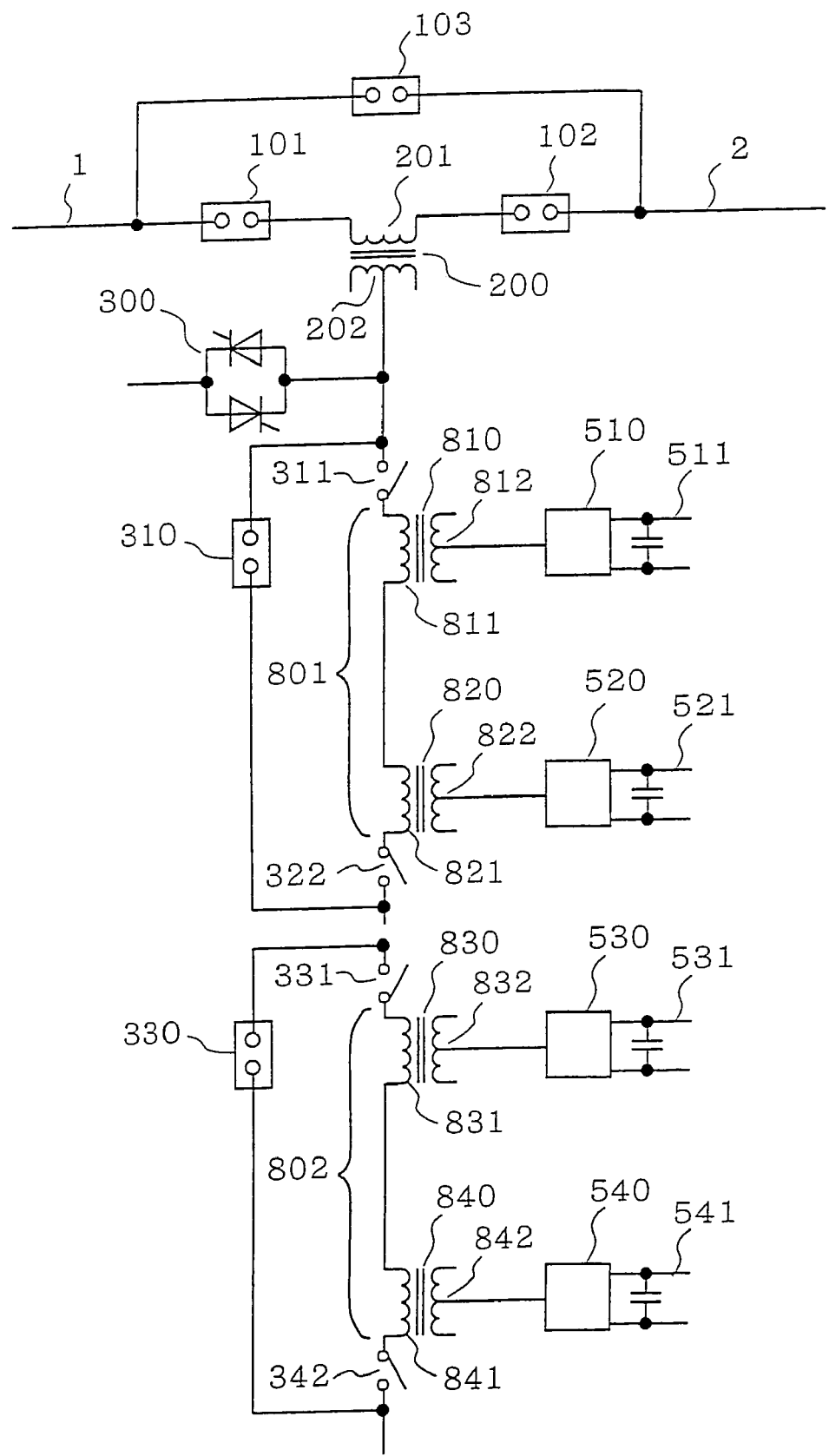
FIG. 6 is a circuit diagram showing the construction of a power converter of a fifth preferred embodiment.

Whereas in the first preferred embodiment one set of switches 311 to 341 and 312 to 342 and current bypass devices 310 to 340 for isolating from the system the primary windings 411 to 441 of the array transformers 410 to 440 was provided per array transformer, in a fifth preferred embodiment shown in FIG. 6, an array transformer 801 is made up of transformers 810 and 820 connected in series. Similarly, an array transformer 802 is made up of a plurality of transformers 830 and 840 connected in series. Normally-on switches 311 and 322 are connected in series with the ends of the series connection of the primary windings 811 and 821 of the plurality of transformers 810 and 820. Similarly, normally-on switches 331 and 342 are connected in series with the ends of the series connections of the primary windings 831 and 841 of the plurality of transformers 830 and 840. One normally-off current bypass device 310 is connected in parallel with the series connection of the plurality of transformers 810 and 820 and the switches 311 and 322 at the ends. Similarly, one normally-off current bypass device 330 is connected in parallel with the series connection of the plurality of transformers 830 and 840 and the switches 331 and 342 at the ends. Also, AC-DC converter units 510 to 540 are respectively connected to the secondary windings 812, 822, 832, 842 of the transformers 810 to 840. By means of the construction shown in FIG. 6 it is possible to reduce cost.

This results in a loss of redundancy of the array transformers and AC-DC converter units, but if redundancy is not a problem for the power converter it is a construction that can be employed.

The alteration of construction applied to the first preferred embodiment to supply the fifth preferred embodiment can also be applied to the second, third, and fourth preferred embodiments.

Sixth Preferred Embodiment

In the first preferred embodiment by connecting not only a capacitor, and also some other energy-storing device to the DC circuit of each AC-DC converter unit, it becomes possible for the active voltage component and the reactive voltage component of the injection voltage outputted by the power converter to be outputted with any phase through 360°.

Examples of energy-storing devices are secondary cells such as batteries, energy-storing devices such as large-capacity capacitors, or another AC-DC converter unit connected by way of a motor-cum-generator to a mechanical energy source such as a flywheel.

Figure 7:
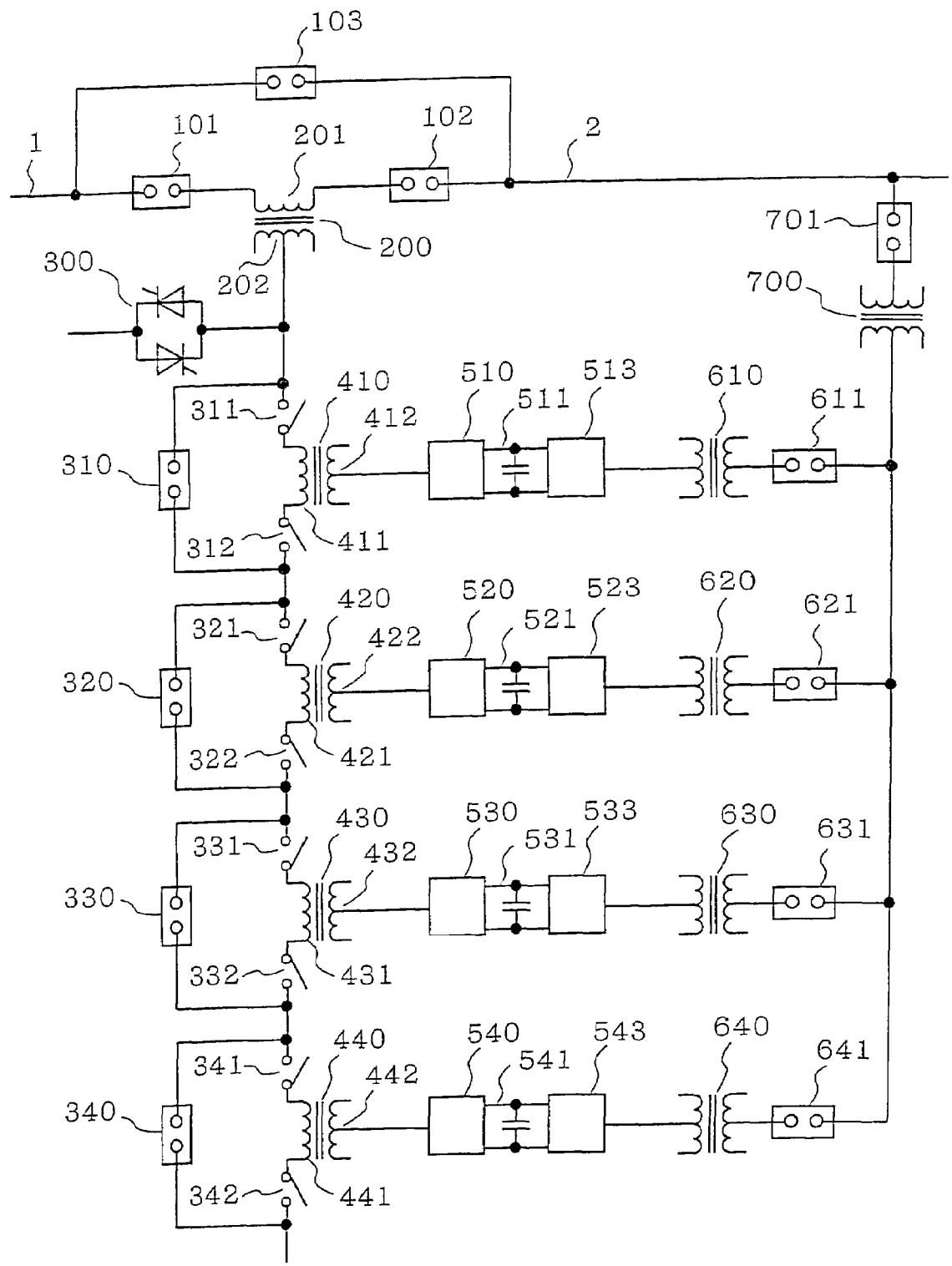
FIG. 7 is a circuit diagram showing the construction of a power converter of a sixth preferred embodiment.
Figure 8:
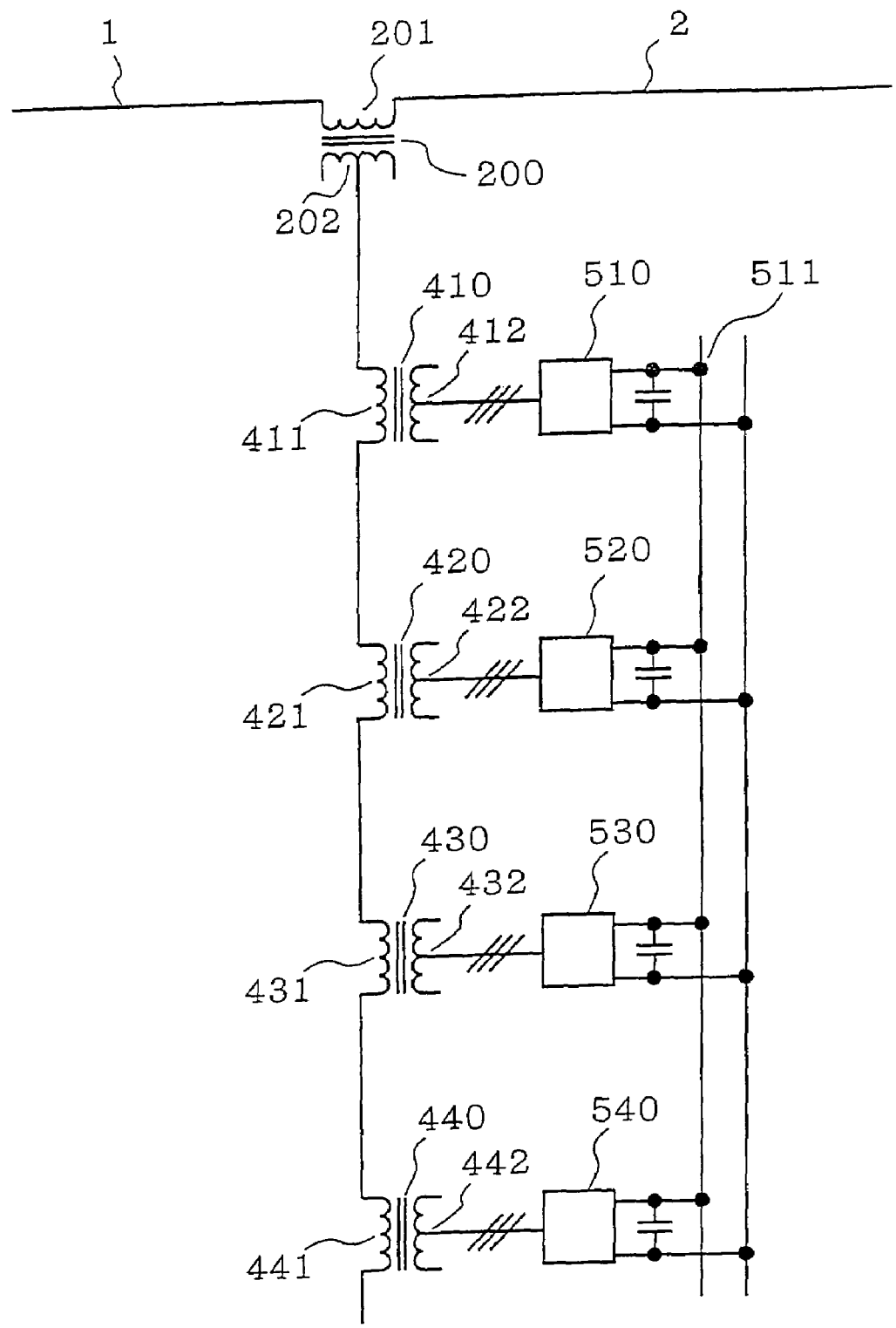
FIG. 8 is a circuit diagram showing the construction of a power converter of related art.

A sixth preferred embodiment shown in FIG. 7 is a construction known as a DVR (Dynamic Voltage Restorer) or UPEC (Unified Power Flow Controller). An independent energy source can be obtained by independently connecting the DC circuits 511, 521, 531, and 541 of AC-DC converter units 510, 520, 530, and 540 to DC-AC converter units 513, 523, 533, and 543 and connecting these DC-AC converter units 513, 523, 533, and 543 individually to the line via transformers 610 to 640, circuit breakers 611, 621, 631, and 641, a transformer 700, and a circuit breaker 701.

INDUSTRIAL APPLICABILITY

As will be clear from the foregoing description, a power converter according to the invention is suitable for use in a line power tide control apparatus capable of continuing to operate after suffering a partial failure.

The invention claimed is:

1. A power converter comprising:
   a series transformer having a primary winding connected in series with a line and having a secondary winding;
   a plurality of array transformers having respective primary and secondary windings, the primary windings being connected in series, wherein the primary windings of the multiple array transformers that are connected in series are connected to the secondary winding of the series transformer;
   a plurality of pairs of normally-on switches, each pair of normally-on switches being connected in series with corresponding ends of the primary winding of a respective array transformer;
   a plurality of normally-off current bypass devices, each normally-off current bypass device being connected in parallel with a respective primary winding of a corresponding one of the array transformers and the switches connected to the ends of the primary winding of the corresponding array transformer;
   a plurality of AC-DC converter units, each AC-DC converter unit having an AC side connected to the secondary winding of one of the array transformers, and a DC side; and
   a plurality of mutually independent DC circuits, each DC circuit being connected to the DC side of a corresponding one of the AC-DC converter units, wherein, by turning on the current bypass device of the primary winding of a specific array transformer and turning off the switches at the ends of the primary winding of the specific array transformer, the specific array transformer and the AC-DC converter unit connected to the specific array transformer are electrically isolated without electrically isolating another array transformer.

2. The power converter according to claim 1, including a plurality of the AC-DC converter units connected to each of the secondary windings of each of the array transformers at the AC sides of the AC-DC converter units, wherein the DC sides of the plurality of AC-DC converter units that are connected to the secondary windings of each of the array transformers are connected to a respective common DC circuit, the common DC circuits connected to the DC sides of respective AC-DC converter units being independent of each other.

3. The power converter according to claim 1, wherein each of the array transformers includes a plurality of transformers connected in series.

4. A power converter comprising:
   a plurality of array transformers having respective primary and secondary windings, the primary windings being connected in series, wherein the primary windings of the multiple array transformers that are connected in series are connected to the secondary winding of a series transformer;
   a plurality of pairs of normally-on switches, each pair of normally-on switches being connected in series with corresponding ends of the primary winding of a respective array transformer;
   a plurality of normally-off first current bypass devices, each normally-off first current bypass device being connected in parallel with a primary winding of a corresponding one of the array transformers and the switches connected to the ends of the primary winding of the corresponding array transformer;
   a plurality of AC-DC converter units, each AC-DC converter unit having an AC side connected to the secondary winding of one of the array transformers, and a DC side;

a plurality of mutually independent DC circuits respectively connected to the DC side of a corresponding one of the AC-DC converter units; and a normally-off second current bypass device connected in parallel with all of the series-connected array transformers, wherein, by turning on the first current bypass device of the primary winding of a specific array transformer and turning off the switches at the ends of the primary winding of the specific array transformer, the specific array transformer and the AC-DC converter unit connected to the specific array transformer are electrically isolated without electrically isolating another array transformer.

5. The power converter according to claim 4, including a plurality of the AC-DC converter units connected to each of the secondary windings of each of the array transformers at the AC sides of the AC-DC converter units, wherein the DC sides of the plurality of AC-DC converter units that are connected to the secondary windings of each of the array transformers are connected to a respective common DC circuit, the common DC circuits connected to the DC sides of respective AC-DC converter units being independent of each other.

6. The power converter according to claim 4, wherein each of the array transformers includes a plurality of transformers connected in series.

* * * * *